(12) United States Patent
Hata et al.

(10) Patent No.: US 9,783,191 B2
(45) Date of Patent: Oct. 10, 2017

(54) CONTROL SYSTEM FOR HYBRID VEHICLE

(71) Applicant: TOYOTA JIDOSHA KABUSHIKI KAISHA, Toyota-shi, Aichi-ken (JP)

(72) Inventors: Kensei Hata, Susono (JP); Yuji Iwase, Mishima (JP); Yosuke Suzuki, Susono (JP); Koichi Kato, Nagoya (JP); Seitaro Nobuyasu, Susono (JP); Taro Moteki, Susono (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/909,824

(22) PCT Filed: Aug. 4, 2014

(86) PCT No.: PCT/IB2014/001453
§ 371 (c)(1),
(2) Date: Feb. 3, 2016

(87) PCT Pub. No.: WO2015/019151
PCT Pub. Date: Feb. 12, 2015

(65) Prior Publication Data
US 2016/0176395 A1   Jun. 23, 2016

(30) Foreign Application Priority Data
Aug. 5, 2013 (JP) ................. 2013-162690

(51) Int. Cl.
*B60W 20/40*    (2016.01)
*B60W 10/115*   (2012.01)
(Continued)

(52) U.S. Cl.
CPC .............. *B60W 20/40* (2013.01); *B60K 6/20* (2013.01); *B60K 6/365* (2013.01); *B60K 6/48* (2013.01);
(Continued)

(58) Field of Classification Search
CPC .... B60W 20/40; B60W 20/00; B60W 10/115; B60W 10/02; B60W 2520/10;
(Continued)

(56) References Cited

U.S. PATENT DOCUMENTS 5,788,006 A   8/1998  Yamaguchi
6,655,485 B1  12/2003 Ito et al.
(Continued)

FOREIGN PATENT DOCUMENTS

CN   101687502 A   3/2010
CN   102050003 A   5/2011
(Continued)

*Primary Examiner* — Mussa A Shaawat
*Assistant Examiner* — Michael Kerrigan
(74) *Attorney, Agent, or Firm* — Andrews Kurth Kenyon LLP

(57) ABSTRACT

A control system for a hybrid vehicle, the hybrid vehicle includes an engine, a first motor, a second motor, a differential mechanism, and a clutch. The control system includes an electronic control unit. The electronic control unit is configured to: (a) set an EV mode in which a vehicle travels at least by drive power of the second motor among the first motor and the second motor in a state that the engine stops, (b) prohibit setting of the EV mode in a state that the clutch is fully engaged when a vehicle speed is at least equal to a predetermined first vehicle speed threshold value, and (c) prohibit setting of the EV mode in a state that the clutch is disengaged when the vehicle speed of the vehicle that travels in the EV mode is at most equal to a predetermined second vehicle speed threshold value.

3 Claims, 5 Drawing Sheets

(51) Int. Cl.
  *B60W 10/02* (2006.01)
  *B60K 6/20* (2007.10)
  *B60K 6/365* (2007.10)
  *B60K 6/48* (2007.10)
  *B60W 20/00* (2016.01)

(52) U.S. Cl.
  CPC .......... *B60W 10/02* (2013.01); *B60W 10/115* (2013.01); *B60W 20/00* (2013.01); *B60W 2520/10* (2013.01); *B60Y 2200/92* (2013.01); *B60Y 2300/182* (2013.01); *B60Y 2300/42* (2013.01); *Y02T 10/6221* (2013.01); *Y02T 10/6239* (2013.01); *Y02T 10/6286* (2013.01); *Y02T 10/7077* (2013.01); *Y10S 903/93* (2013.01)

(58) Field of Classification Search
  CPC .. B60K 6/48; B60K 6/365; B60K 6/20; Y02T 10/6221; Y02T 10/6286; Y02T 10/6239; Y02T 10/7077; B60Y 2300/42; B60Y 2300/182; B60Y 2200/92; Y10S 903/93
  See application file for complete search history.

(56) References Cited

U.S. PATENT DOCUMENTS

| | | | |
|---|---|---|---|
| 7,314,426 B2 * | 1/2008 | Imazu | B60K 6/445 477/15 |
| 2010/0262322 A1 | 10/2010 | Yokouchi et al. | |
| 2011/0111906 A1 | 5/2011 | Kim et al. | |
| 2012/0265387 A1 | 10/2012 | Hisada et al. | |

FOREIGN PATENT DOCUMENTS

| | | |
|---|---|---|
| JP | H08-295140 A | 11/1996 |
| JP | 2001-112118 A | 4/2001 |
| JP | 2012-066609 A | 4/2012 |
| JP | 2012-224148 A | 11/2012 |

* cited by examiner

| TRAVEL MODE | K0 CLUTCH ENGAGED: ○ DISENGAGED: — |
|---|---|
| DISCONNECTED EV | — |
| NORMAL EV | ○ |
| HV MODE | ○ |

CONTROL SYSTEM FOR HYBRID VEHICLE

CROSS-REFERENCE TO RELATED APPLICATIONS

This is a national phase application based on the PCT International Patent Application No. PCT/IB2014/001453 filed Aug. 4, 2014, claiming priority to Japanese Patent Application No. 2013-162690 filed Aug. 5, 2013, the entire contents of both of which are incorporated herein by reference.

BACKGROUND OF THE INVENTION

1. Field of the Invention

The present invention relates to a control system for a hybrid vehicle that includes an engine and either a motor or a motor generator as drive power sources, and in particular to a travel mode control system in a hybrid vehicle that is configured to be capable of disconnecting an engine from a drive power transmission system.

2. Description of Related Art

As a type of a hybrid drive device, a so-called two-motor hybrid type has been known that controls an engine speed by a first motor or a motor generator (hereinafter, may collectively be referred to as a motor) and drives a second motor by electric power that is generated by the first motor. In this type of the device, the engine speed may be controlled by the first motor while engine output is maintained to be constant. Thus, in order to allow such control, the engine and the first motor are connected via a differential mechanism. An example of this is disclosed in Japanese Patent Application Publication No. 08-295140 (JP 08-295140 A).

A configuration of the example will be briefly described. A first rotary element in a planetary gear train, which is the differential mechanism, is connected to a generator, a second rotary element serves as an output element, and a third rotary element is connected to braking means. Then, an engine is connected to the third rotary element via a clutch. A motor is connected to the second rotary element. Thus, in the configuration disclosed in JP 08-295140 A, when a first motor functions as the generator in a state that the engine is driven to run a vehicle, an engine speed is set to a speed that corresponds to a rotational speed of the first motor. In this case, the electric power that is generated by the first motor is supplied to a second motor. Torque output by the second motor is combined with torque transmitted from the engine and is transmitted to drive wheels. In addition, since the differential mechanism functions as a speed reduction gear or a speed increasing gear when the third rotary element is fixed by the engine or the braking means, the torque of the first motor, which is connected to the first rotary element, can be transmitted to the output element. In other words, the vehicle can travel by power that is output from the first and second motors. Then, as the braking means, if a one-way clutch is adopted that is engaged when the torque is applied to the third rotary element in a direction to reversely rotate the third rotary element so as to fix the third rotary element, the third rotary element can be fixed not by the engine but by the one-way clutch while the vehicle travels by the motor. In addition, the engine can be disconnected from the third rotary element in this case. Thus, it is possible to keep driving or stop the engine.

SUMMARY OF THE INVENTION

In a hybrid vehicle that is disclosed in JP 08-295140 A described above, the clutch can remain engaged when the vehicle travels by the second motor. However, if a vehicle speed becomes a high vehicle speed in such a state, either a sun gear as a reaction element or the first motor connected to the sun gear rotates at a high speed in an opposite direction (an opposite rotational direction from an engine rotational direction), and consequently, a rotational speed of a pinion gear becomes a high rotational speed. Meanwhile, a travel mode in which the clutch is engaged and the vehicle travels by the motor or another travel mode in which the clutch is disengaged to travel the vehicle by the motor can be selected in accordance with a vehicle travel state, such as requested drive power or the vehicle speed. However, if a time required for a clutch disengagement operation is extended due to deterioration with age or the like of an operation mechanism that engages and disengages the clutch, there is a possibility that the rotational speed of the sun gear or the first motor is increased due to an increase in the vehicle speed during the disengagement operation. Since the first motor can function as the generator, it can generate electric power while reversely rotating, and thus can regenerate energy. However, if a state of charge (SOC) of an electric power storage device has reached saturation, the generated electric power cannot be charged therein and thus cannot be used effectively. Accordingly, an electric power consumption rate (so-called electricity efficiency) or a fuel consumption rate (so-called fuel economy) worsens.

Furthermore, since the above clutch can remain disengaged during traveling, there is a case where the vehicle stops and a main switch is turned off while the clutch is fully disengaged or partially disengaged. Alternatively, there is a possibility that the clutch cannot be engaged due to abnormality of certain kind when the clutch is disengaged and the vehicle travels by the motor. In such a case, not only the engine cannot be restarted, but also there is a possibility that a reduction in the SOC of the electric power storage device prevents an evacuation travel (a limp-home travel) or a travel to a repair shop. In addition, if the clutch is a dry clutch that is used in a vehicle equipped with a manual transmission, for example, the clutch is left in a fully disengaged state or a partially disengaged state while being exposed to the outside of the vehicle. Thus, such a possibility is increased that a friction characteristic thereof is changed due to invasion of a foreign object or water to a friction surface or that wear of the friction surface is promoted.

Moreover, if the engine is started to start running the vehicle that is stopped while the clutch is fully disengaged or partially disengaged, the engine torque may be applied to the clutch in a state that a transmission torque capacity is not sufficiently increased. In such a case, start acceleration may worsen due to a delay in a rise of drive torque, the wear of the clutch may be promoted and durability thereof may be reduced due to an increase in the sliding rotational speed of the clutch, or power loss may be increased.

The prevent invention provides a control system for a hybrid vehicle that can prevent or suppress abnormality of or a reduction in durability of a differential mechanism to which an engine is connected or a clutch that connects the engine to the differential mechanism.

A control system for a hybrid vehicle according to one aspect of the present invention, the hybrid vehicle includes an engine, a first motor, a second motor, a differential mechanism, and a clutch. The second motor is configured to output drive torque to a drive wheel. The differential mechanism is configured to perform a differential action by at least three rotary elements. Any one of the rotary elements in the differential mechanism serves as an input element to which drive power is transmitted from the engine. Another one of the rotary elements in the differential mechanism is connected to the first motor and serves as a reaction force element. Remaining one of the rotary elements in the differential mechanism serves as an output element for outputting torque to the drive wheel. The clutch is configured to connect the engine to the input element and disconnect the engine from the input element. The electronic control unit is configured to (a) set an EV mode in which a vehicle travels at least by drive power of the second motor among the first motor and the second motor in a state that the engine stops, (b) prohibit setting of the EV mode in a state that the clutch is fully engaged when a vehicle speed is at least equal to a predetermined first vehicle speed threshold value, and (c) prohibit setting of the EV mode in a state that the clutch is disengaged when, the vehicle speed of the vehicle that travels in the EV mode is at most equal to a predetermined second vehicle speed threshold value. The second vehicle speed threshold value being smaller than the first vehicle speed threshold value.

In the control system according to the one aspect of the present invention, the differential mechanism may be configured by a planetary gear train, the input element may be a rotary element represented by a straight line at the center in a collinear diagram of the planetary gear train in which the three rotary elements are represented by straight lines that are parallel to each other, and the reaction force element may be a rotary element that is represented by another straight line in the collinear diagram.

In addition, in the control system according to the one aspect of the present invention, prohibition to set the EV mode in the state that the clutch is fully engaged may be canceled and setting of the EV mode in the state that the clutch is fully engaged may be permitted under a condition that a time required to disengage the clutch is at most equal to a predetermined reference value and the vehicle speed is at least equal to the first vehicle speed threshold value and is lower than a third vehicle speed threshold value. The third vehicle speed threshold value being larger than the first vehicle speed threshold value.

According to the present invention, the engine stops in the EV mode in which the vehicle travels at least by the drive power of the second motor. Accordingly, the input element in the differential mechanism can rotate in a state that the clutch is fully disengaged or half-disengaged with slippage. On the contrary, if the clutch is fully engaged, the input element stops rotating together with the engine. If the vehicle speed in the EV mode is at least equal to the first vehicle speed threshold value, the above-mentioned EV mode in which the clutch is fully engaged is prohibited. Accordingly, even when the rotational speed of the output element in the differential mechanism is a high rotational speed, it is possible to prevent or suppress each of a rotational speed of the reaction force element and a rotational speed of the first motor, which is connected to the reaction force element, from becoming an excessively high rotational speed. In addition, in a case where the differential mechanism is configured by a planetary gear train that includes a pinion gear, for example, it is possible to prevent or suppress a rotational speed of the pinion gear from an excessively high rotational speed.

Furthermore, if the vehicle speed is at most equal to a second vehicle speed threshold value, the EV mode in which the clutch is disengaged is prohibited, and an engaged state of the clutch is maintained. In this case, since the rotational speed of the output element is a low rotational speed due to a low vehicle speed, it is possible to prevent or suppress each of the rotational speed of the reaction force element, the rotational speed of the first motor, which is connected to the reaction force element, and a rotational speed of the pinion gear from becoming the excessively high rotational speed. In addition, even when the vehicle stops while the above circumstance is maintained, the engine can be restarted at least by the first motor, or the first motor is driven by the engine to generate electric power. It is because the clutch is engaged and the engine is connected to the input element. Furthermore, even if the clutch is configured to be exposed to the outside of the vehicle, it is possible to prevent or suppress invasion of a foreign object or water to a friction surface. It is because the clutch is engaged while the vehicle stops, and because the friction surface thereof is closed.

Moreover, in the present invention, if the vehicle speed is at most equal to the third vehicle speed threshold value, prohibition to set the EV mode in which the clutch is engaged is canceled under a condition that a time required for disengagement of the clutch is short, and consequently, setting of the EV mode in which the clutch is engaged is permitted. As a result, a frequency of an opportunity to set the EV mode in which the clutch is engaged, is increased. Accordingly, it is possible to improve responsiveness to start the engine or responsiveness of control to transmit the drive power of the engine to the drive wheel in a case where an acceleration request is made, for example. In addition, since the engine is connected to the differential mechanism, the moment of inertia of a power train is increased as a whole, and thus an NV (noise and vibration) characteristic is improved.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

A hybrid vehicle to which the present invention is applied is a vehicle in which an engine and a motor are connected via a differential mechanism so that an engine speed is controlled by either the motor or a motor generator (hereinafter may collectively be referred to as the motor), and in which a clutch is further provided between the engine and the differential mechanism so that the engine can be disconnected from the differential mechanism. The differential mechanism has a function to divide power that is output by the engine, and a second motor is provided to convert electric power that is generated when the above motor functions as a generator to mechanical power and outputting the mechanical power to drive wheels. This type of a hybrid drive system is sometimes referred to as a two-motor hybrid drive device, and an example of this is shown in FIG. 4.

Figures 4, 5:
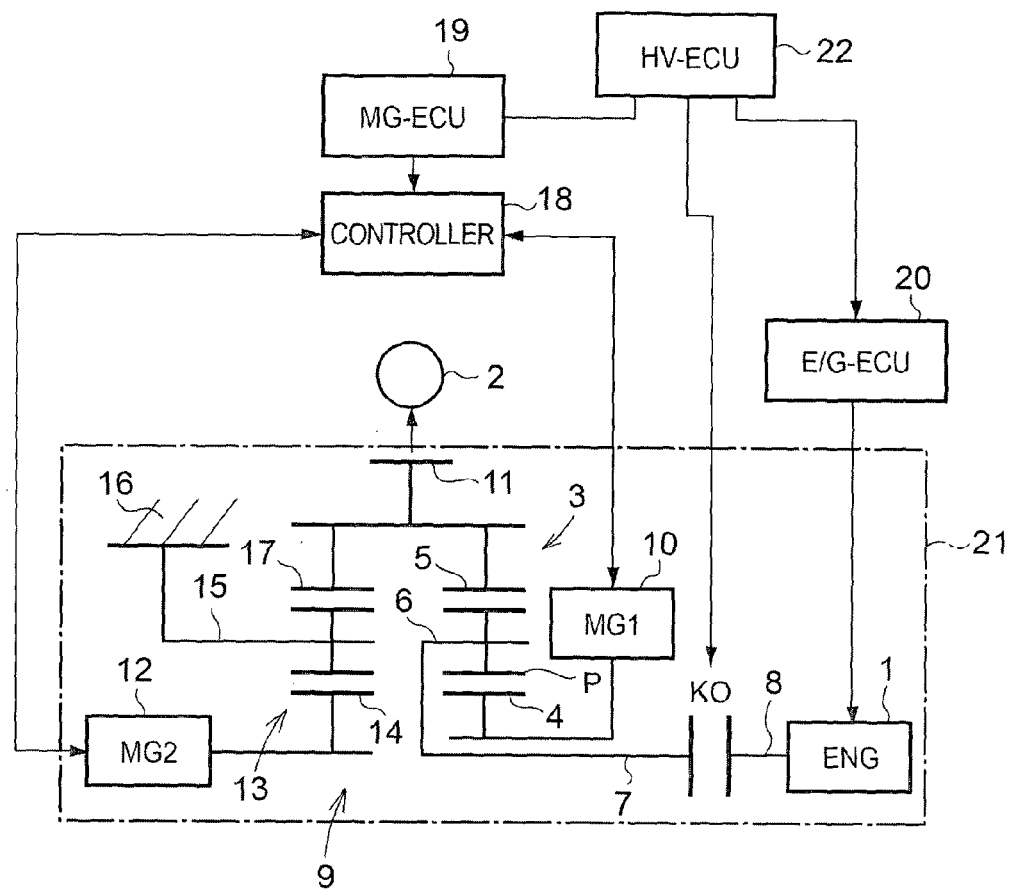
FIG. 4 is a skeleton view for showing an example of a gear train in a hybrid vehicle to which the present invention can be applied.
FIG. 5 is a table for collectively showing an engaged or disengaged state of a clutch for each travel mode.

FIG. 4 is a schematic diagram for showing an example of a gear train in the hybrid vehicle that includes the above clutch. The example shown here is configured such that a part of power output by an engine (ENG) 1 is transmitted to a drive wheel 2 via a power dividing mechanism 3 and that, after another part of the power output by the engine 1 is converted to electric power, the electric power is inversely converted to mechanical power and transmitted to the drive wheel 2. The power dividing mechanism 3 has a same configuration as a power dividing mechanism in a conventionally known two-motor hybrid drive device. In the example shown in FIG. 4, the power dividing mechanism 3 is configured by a planetary gear train that causes a differential action by three rotary elements, and is configured by a planetary gear train of a single pinion type, for example. The planetary gear train of the single pinion type is configured by: a sun gear 4; a ring gear 5 that is concentrically arranged with respect to the sun gear 4; and a carrier 6 that retains a pinion gear P to allow rotation and revolution thereof, the pinion gear P meshing with the sun gear 4 and the ring gear 5.

The carrier 6 serves as an input element, and an input shaft 7 is connected to the carrier 6. In addition, a clutch K0 is provided between the input shaft 7 and an output shaft (a crankshaft) 8 of the engine 1. The clutch K0 connects/disconnects the engine 1 to/from a power transmission system 9 such as the power dividing mechanism 3, and is configured by a friction clutch whose transmission torque capacity is continuously changed from a fully disengaged state in which the transmission torque capacity is "0" to a fully engaged state with no slippage. The friction clutch may be a dry type or a wet type, which has conventionally been known, and may be a single-plate type or a multiplate type. Furthermore, an actuator (not shown) for switching between the engaged state and the disengaged state may be a hydraulic actuator, an electromagnetic actuator, or the like. If the clutch is a dry single-plate clutch, which is adopted in a conventional vehicle, for example, the engaged state thereof is maintained by a so-called return mechanism such as a diaphragm spring (either component is not shown) when the actuator is brought into a non-operative state. Accordingly, the transmission torque capacity of the clutch K0 changes in accordance with an operation amount of the actuator for engaging or disengaging the clutch K0, and a correlative relationship is established between the clutch K0 and the actuator. More specifically, a substantially proportional relationship is established between the transmission torque capacity and a hydraulic pressure, a current value; or a stroke amount of the actuator. Thus, the transmission torque capacity can be predetermined as a value that is associated with the operation amount of the actuator, such as the stroke amount or the hydraulic pressure, and can be prepared in a form of a map or the like. It should be noted that, if a friction coefficient changes over time, the relationship between the transmission torque capacity and the above operation amount changes.

Meanwhile, the sun gear 4 serves as a reaction force element, and a first motor generator (MG1) 10 is connected to the sun gear 4. The first motor generator 10 is a motor with an electric power generating function, and is configured by a synchronous motor of permanent magnet type or the like. Furthermore, it is configured that the ring gear 5 serves as an output element, that an output gear 11 as an output member is integrated with the ring gear 5, and that the output gear 11 outputs the drive power to the drive wheel 2. Here, since a mechanism for transmitting the drive power from the output gear 11 to the drive wheel 2 includes a differential gear and a drive shaft and is same as a mechanism in a conventional vehicle, a detailed description thereof will not be made.

The engine 1, the power dividing mechanism 3, and the first motor generator 10, which are described above, are aligned on a same axis, and a second motor generator 12 is arranged on an extension of the axis. The second motor generator 12 generates the drive power for traveling, regenerates energy, and is configured by the synchronous motor of permanent magnet type like the first motor generator 10, which is described above. The second motor generator 12 and the output gear 11 are connected via a speed reduction mechanism 13. In the example shown in FIG. 4, the speed reduction mechanism 13 is configured by the planetary gear train of the single pinion type, in which a sun gear 14 is connected to the second motor generator 12, a carrier 15 is fixedly connected to a fixed section 16 such as a housing, and a ring gear 17 is integrated with the output gear 11.

Each of the motor generators 10, 12, which is described above, is electrically connected to a controller 18 that includes an electric power storage device, an inverter, and the like. An electronic control unit for a motor generator (MG-ECU) 19 that controls the controller 18 is provided. The electronic control unit 19 is configured by a microcomputer as a main component to compute on the basis of input data, stored date, a command signal, or the like and to output a computation result as a control command signal to the controller 18. Then, it is configured that each of the motor generators 10, 12 functions as either the motor or the generator on the basis of a control signal from the controller 18 and that torque in either case is controlled.

The engine 1, which is described above, is configured such that output, startup, and stop thereof are electrically controlled. For example, in a case of a gasoline engine, it is configured such that a throttle opening amount, a fuel supply amount, stop of fuel supply, execution and stop of ignition, ignition timing, and the like are electrically controlled. An electronic control unit for an engine (E/G-ECU) 20 is provided to execute such control. The electronic control unit 20 is configured by a microcomputer as a main component to compute on the basis of input data or a command signal, output a computation result as a control signal to the engine 1, and thereby execute various types of control, which are described above.

The engine 1, each of the motor generators 10, 12, the clutch K0, the power dividing mechanism 3, and the like, which are described above, constitute a drive power source 21, and an electronic control unit for hybrid (HV-ECU) 22 is provided to control the drive power source 21. The electronic control unit 22 is configured by a microcomputer as a main component to output a command signal to the electronic control unit for a motor generator 19 and the electronic control unit for an engine 20, which are described above, and execute various types of control, which will be described below.

In the hybrid drive system that is shown in FIG. 4, it is possible to set either a hybrid (HV) mode in which the vehicle travels by the power of the engine 1 or an electric vehicle (EV) mode in which the vehicle travels by the electric power. Furthermore, as the EV mode, it is possible to set either a disconnected EV mode in which the engine 1 is disconnected from the power transmission system 9 or a normal EV mode in which the engine 1 is connected to the power transmission system 9. The engaged and disengaged states of the clutch K0 when these modes are set are collectively shown in FIG. 5. More specifically, the clutch K0 is disconnected in the disconnected EV mode. On the contrary, the clutch K0 is engaged in the normal EV mode and the HV mode. Here, "disengagement of the clutch K0" refers to a state in which the clutch K0 in the slip state transmits the torque, that is, includes a half-engaged state and a half-disengaged state. Meanwhile, "engagement of the clutch K0" refers to a fully engaged state with no slippage. These travel modes are selected in accordance with a vehicle travel state such as a requested drive amount like an accelerator pedal operation amount, a vehicle speed, a state of charge (SOC) of the electric power storage device, or the like. For example, the HV mode is set in a case where the vehicle travels at a speed that is fast to some extent and the accelerator pedal operation amount is large to some extent so as to maintain the vehicle speed. Meanwhile, the normal EV mode is set in a case where the SOC is sufficiently large and the accelerator pedal operation amount is relatively small, in a case where the vehicle is in a travel state in which the automatically stopped engine 1 is highly likely to be restarted, or the like. Furthermore, the disconnected EV mode is set in a case where the EV mode is manually selected by an operation of a driver, for example, in a case where the vehicle can travel only by the electric power and there is a need to suppress power loss that is caused by dragging of the first motor generator 10, or the like.

Figure 6:
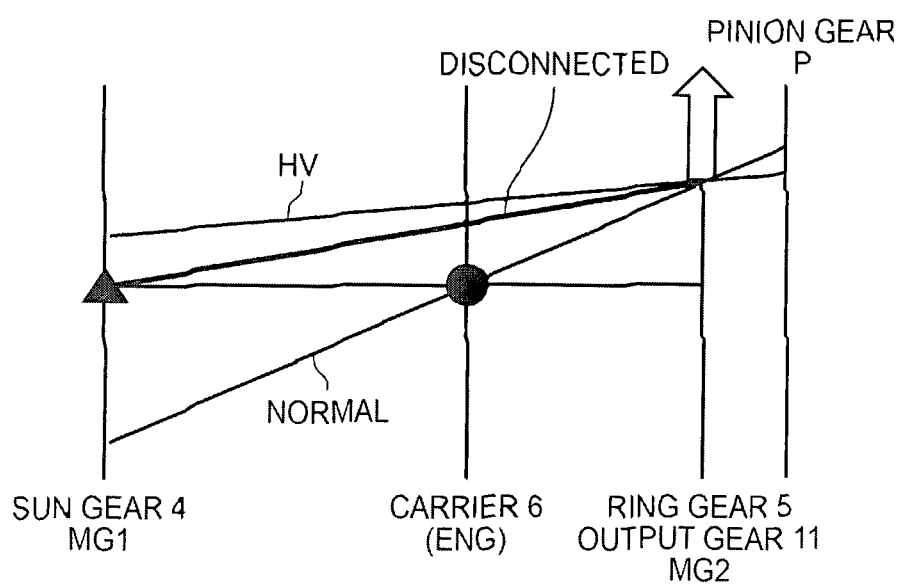
FIG. 6 is a collinear diagram for illustrating an operation state in the each travel mode.

An operation state of the hybrid drive system in the each travel mode will be briefly described here. FIG. 6 is a collinear diagram regarding the power dividing mechanism 3, which is described above. In the collinear diagram, the sun gear 4, the carrier 6, the ring gear 5, and the pinion gear P are indicated by vertical lines, and a gap between each two of these corresponds to a gear ratio of the planetary gear train that constitutes the power dividing mechanism 3. Furthermore, a vertical direction of the each vertical line is set to a rotational direction, and a position in the vertical direction is set to a rotational speed. Accordingly, in the collinear diagram of FIG. 6, the carrier 6 is represented by the line that is located at the center, and the engine 1 is connected thereto. In addition, in the collinear diagram of FIG. 6, the sun gear 4 is represented by a left end line, and the first motor generator 10 is connected thereto. A line that is indicated as "DISCONNECTED" in FIG. 6 indicates the operation state in the disconnected EV mode. In this travel mode, the second motor generator 12 functions as the motor whose power is used to run the vehicle, the engine 1 is disconnected from the power transmission system 9 and stopped due to the disengagement of the clutch K0, and the first motor generator 10 is also stopped. Accordingly, the rotation of the sun gear 4 is stopped, the ring gear 5 rotates forwardly with the output gear 11, and the carrier 6 rotates forwardly at a rotational speed that is reduced in accordance with the gear ratio of the planetary gear train with respect to the rotational speed of the ring gear 5.

In addition, a line that is indicated as "NORMAL" in FIG. 6 indicates the operation state in the normal EV mode. In this travel mode, since the vehicle travels by the power of, the second motor generator 12 and the engine 1 is stopped, the ring gear 5 rotates forwardly and the sun gear 4 rotates reversely in a state that the carrier 6 is fixed. In this case, the first motor generator 10 can function as the generator. Furthermore, a line that is indicated as "HV" in FIG. 6 indicates a travel state in the HV mode. Since the engine 1 outputs the drive power in a state that the clutch K0 is engaged, the torque is applied to the carrier 6 in the direction to cause the forward rotation thereof. Since the first motor generator 10 functions as the generator in this state, the torque in a reverse rotational direction is applied to the sun gear 4. As a result, torque that causes the forward rotation of the ring gear 5 is generated by the ring gear 5. Also in this case, the electric power that is generated by the first motor generator 10 is supplied to the second motor generator 12, the second motor generator 12 thus functions as the motor, and the drive power thereof is transmitted to the output gear 11. Accordingly, in the HV mode, a part of the power that is output by the engine 1 is transmitted to the output gear 11 via the power dividing mechanism 3. Meanwhile, rest of the power is converted to the electric power by the first motor generator 10, transmitted to the second motor generator 12, further converted to the mechanical power again by the second motor generator 12, and transmitted to the output gear 11. In any of the travel modes, when there is no need to actively output the drive power such as during deceleration, either one of the motor generators 10, 12 functions as the generator to regenerate the energy.

The hybrid vehicle, to which the present invention is applied, can be set in the EV mode in which the vehicle travels by the drive power of the second motor generator 12. Furthermore, since the hybrid vehicle includes the clutch K0, it can also be set in the normal EV mode in which the engine 1 is connected to the power dividing mechanism 3 and in the disconnected EV mode in which the engine 1 is disconnected from the power dividing mechanism 3. Of these EV modes, the carrier 6, to which the engine 1 is connected, is fixed in the normal EV mode. Accordingly, as shown in the collinear diagram of FIG. 6, the sun gear 4 and the first motor generator 10, which is connected to the sun gear 4, rotate reversely, and the pinion gear P rotates forwardly at a higher speed than the ring gear 5. Meanwhile, in the disconnected EV mode, the carrier 6 can still rotate although the engine 1 is stopped. Accordingly, it is possible to stop rotation of the sun gear 4 and the first motor generator 10, which is connected to the sun gear 4. However, when the travel mode is switched from the disconnected EV mode to another travel mode, the control must be executed to engage the clutch K0.

Figure 1:
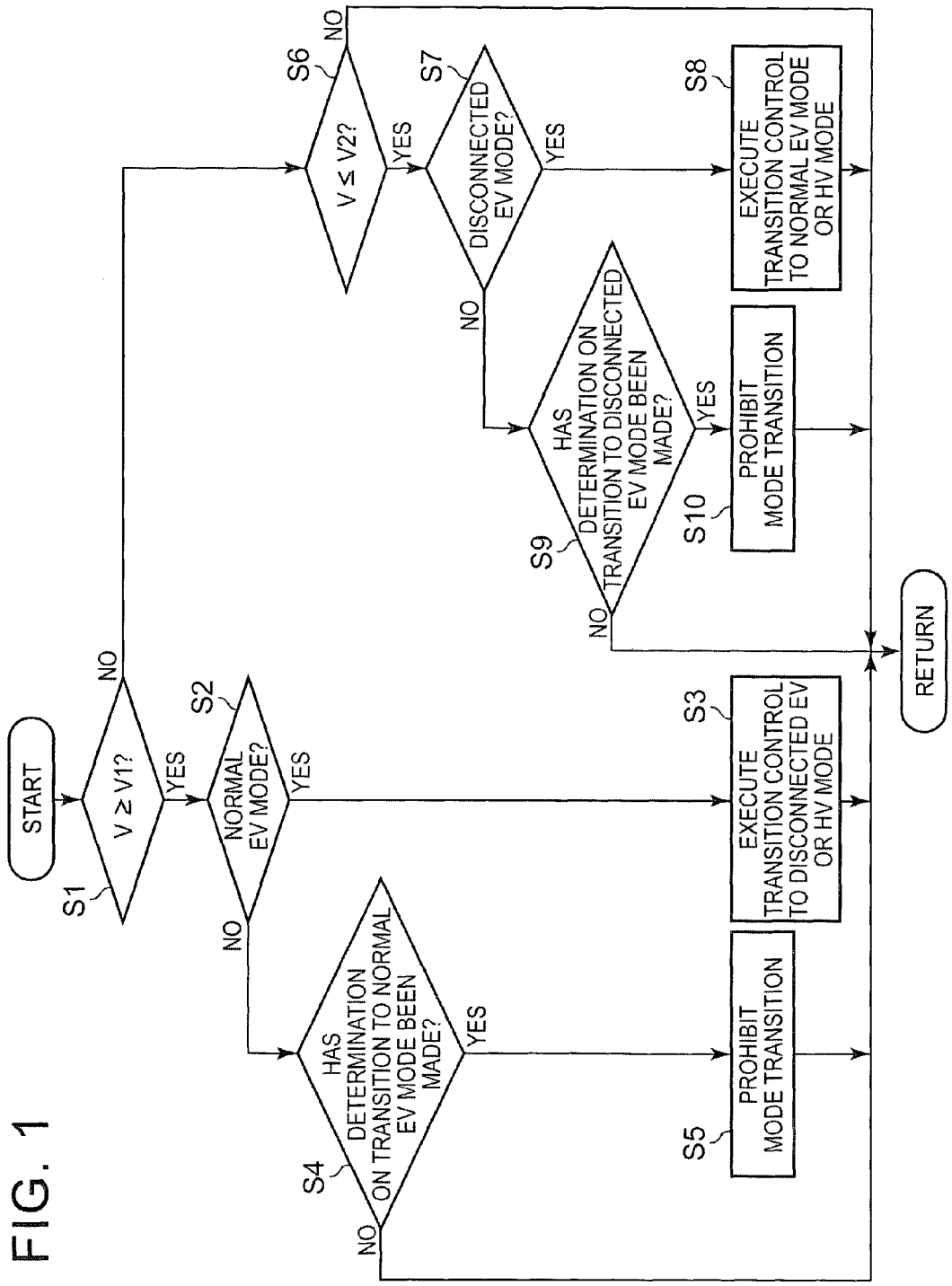
FIG. 1 is a flowchart for illustrating an example of control that is executed by a control device according to the present invention.

In view of the above, a control device according to the present invention is configured to execute following control in order to prevent or suppress an excessive increase in the rotational speed of the first motor generator 10 and that of the pinion gear P, and also to maintain the engagement of the clutch K0 without causing any inconvenience. FIG. 1 is a flowchart for illustrating an example of such control, and this routine is repeatedly executed at every specified short time interval while the hybrid vehicle travels.

In FIG. 1, it is first determined whether a vehicle speed V is at least equal to a specified threshold value V1 (a step S1). This threshold value corresponds to a first vehicle speed threshold value in the present invention. This threshold value also corresponds to a rotational speed that is set in terms of the design to prevent the rotational speed of the first motor generator 10, which is connected to the sun gear 4, or the rotational speed of the pinion gear P from becoming an excessively high rotational speed in a case where the vehicle travels forward while the carrier 6 is fixed as described above. Furthermore, this threshold value can be determined on the basis of the first motor generator 10 or the planetary gear train to be used, a bearing used in the first motor generator 10 or the planetary gear train, a guaranteed service life of the first motor generator 10 or the planetary gear train, or the like. It should be noted that the vehicle speed V can be obtained by a sensor that is normally provided in the vehicle.

If the vehicle speed V is the high vehicle speed that is at least equal to the first vehicle speed threshold value, and thus the determination in the step S1 is positive, it is determined whether the normal EV mode has been set (a step S2). The normal EV mode is a so-called motor travel mode in which the vehicle travels by the drive power of the second motor generator 12 in a state that the clutch K0 is engaged and that the carrier 6 is fixed together with the engine 1. Accordingly, the normal EV mode is set on the basis of the control signal from the electronic control unit for hybrid 22, which is described above, when such conditions that the SOC of the electric power storage device is sufficiently large, that the requested drive power (accelerator pedal operation amount) is not particularly large, and the like are satisfied.

If the normal EV mode has been set, and thus the determination in the step S2 is positive, transition control to the disconnected EV mode or the hybrid (HV) mode is executed (a step S3), and the routine returns. That is, the travel mode is switched to the disconnected EV mode or the HV mode, and it is prohibited from setting the normal EV mode. In other words, it is prohibited from engaging the clutch K0 in the EV mode. As described above, while the clutch K0 is engaged in the normal EV mode, the clutch K0 is disengaged in the disconnected EV mode. Accordingly, even when the rotational speed of the ring gear 5 becomes a high rotational speed in conjunction with the high vehicle speed, the rotational speed of the sun gear 4 and the rotational speed of the first motor generator 10, which is connected to the sun gear 4, can be reduced, or the sun gear 4 and the first motor generator 10 can be stopped from rotating. Also, the rotational speed of the pinion gear P does not become excessively high. Meanwhile, the clutch K0 is engaged in the HV mode, and the engine 1 and the carrier 6, to which the engine 1 is connected, rotate forwardly. Accordingly, even when the rotational speed of the ring gear 5 becomes the high rotational speed in conjunction with the high vehicle speed, the rotational speed of the sun gear 4 and the rotational speed of the first motor generator 10, which is connected to the sun gear 4, can be reduced. Also, the rotational speed of the pinion gear P does not become excessively high.

On the other hand, if the normal EV mode has not been set, and thus the determination in the step S2 is negative, it is determined whether a determination has been made to make the transition (switch) to the normal EV mode (a step S4). This determination is established, for example, in a case where the following conditions are satisfied: that the accelerator pedal operation amount is reduced in a state that the vehicle travels by the drive power of the engine 1; and that the SOC of the electric power storage device is sufficiently large. This determination is also established in a case where the accelerator pedal operation amount is increased or the SOC of the electric power storage device is reduced in a state that the vehicle travels in the disconnected EV mode on the contrary to the above, and thus the engine 1 has, to be started. If the determination in the step S4 is negative, the current travel mode only needs to be maintained. Thus, no control is particularly executed, and the routine returns. On the other hand, if the determination has been made to make the transition to the normal EV mode, and thus the determination in the step S4 is positive, the transition (switching) of the travel mode is prohibited (a step S5). In other words, the normal EV mode is prohibited, and this is substantially the same as a case where the control in the above step S3 is executed. Thus, it is also possible in this case to reduce the rotational speed of the sun gear 4 and the rotational speed of the first motor generator 10, which is connected to the sun gear 4, and it is further possible to avoid or suppress the rotational speed of the pinion gear P from becoming excessively high.

Figure 2:
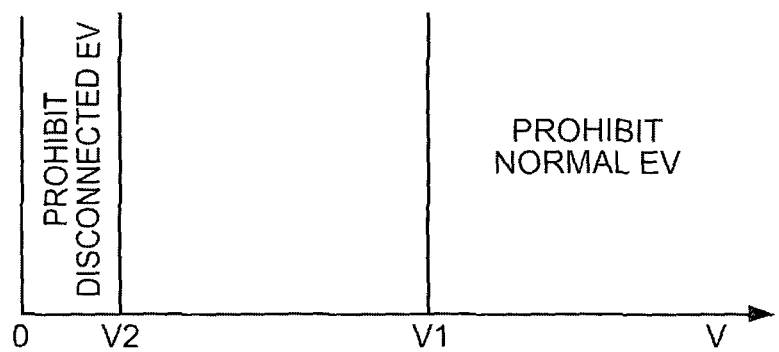
FIG. 2 is a diagram for showing a relationship between a travel mode and both of a first vehicle speed threshold value and a second vehicle speed threshold value.

Furthermore, if the vehicle speed V is lower than the first vehicle speed threshold value V1, which is described above, and thus the determination in the step S1 is negative, it is determined whether the vehicle speed V is at most equal to a second vehicle speed threshold value V2 (a step S6). The step S6 provides a process to predict or estimate the stop of the vehicle. Thus, a value that is smaller than the above-mentioned first vehicle speed threshold value V1 and is close to "0" is adopted as the second vehicle speed threshold value V2. If a road condition or a traveling environment can be obtained by a navigation system, a radar cruise system, or the like, the stop of the vehicle may be predicted or estimated on the basis of thus-obtained data and the vehicle travel state. A relationship of the first vehicle speed threshold value V1 and the second vehicle speed threshold value V2 is shown in a diagram in FIG. 2.

If the vehicle speed V is high to some extent, and thus the determination in the step S6 is negative, no control is particularly executed, and the routine returns. On the other hand, if the vehicle speed V is at most equal to the second vehicle speed threshold value V2, and thus the determination in the step S6 is positive, it is determined whether the disconnected EV mode has been set (a step S7). The disconnected EV mode is the so-called motor travel mode in which the clutch K0 is disengaged, the engine 1 is thereby disconnected from the power dividing mechanism 3, and the carrier 6 is brought into a state of being rotatable even when the engine 1 is stopped, so that the vehicle travels by the drive power of the second motor generator 12. Accordingly, the disconnected EV mode is set on the basis of the control signal from the electronic control unit for hybrid 22, which is described above, when such conditions that the SOC of the electric power storage device is sufficiently large, that the requested drive power (accelerator pedal operation amount) is not particularly large, that the engine 1 is unlikely to be restarted, that the power loss caused by dragging of the first motor generator 10 has to be suppressed, that generation of the electric power by the first motor generator 10 is not particularly required, and the like are satisfied.

If the disconnected EV mode has been set, and thus the determination in the step S7 is positive, the transition control to the normal EV mode or the HV mode is executed (a step S8), and the routine returns. That is, the travel mode is switched to the normal EV mode or the HV mode, and it is prohibited from setting the disconnected EV mode. In other words, it is prohibited from disengaging the clutch K0 in the EV mode. As described above, while the clutch K0 is disengaged in the disconnected EV mode, the clutch K0 is engaged in the normal EV mode. Accordingly, the sun gear 4, the first motor generator 10, which is connected to the sun gear 4, and the pinion gear P each rotate at a rotational speed that corresponds to a gear ratio between the ring gear 5 and the planetary gear train for constituting the power dividing mechanism 3 (a ratio of the number of teeth of the ring gear 5 to the number of teeth of the sun gear 4), that is, a rotational speed that corresponds to the vehicle speed V. Here, as indicated by the positive determination in the step S6, the vehicle speed V in this case is a low vehicle speed at which the vehicle travels immediately before stopping. Thus, the rotational speed of the first motor generator 10 and that of the pinion gear P do not become excessively high. In addition, as described above, the rotational speed of the first motor generator 10 and that of the pinion gear P do not become excessively high in the HV mode.

On the other hand, if the disconnected EV mode has not been set, and thus the determination in the step S7 is negative, it is determined whether a determination has been made to make the transition (switch) to the disconnected EV mode (a step S9). This determination is established, for example, in a case where the following conditions are satisfied: that the accelerator pedal operation amount is reduced in a state that the vehicle travels by the drive power of the engine 1; that the SOC of the electric power storage device is sufficiently large; and that the vehicle speed V is at least equal to the second vehicle speed threshold value V2. This determination is also established in a case where the vehicle speed V is increased in a state that the vehicle travels in the normal EV mode, or in a case where it becomes necessary to suppress the power loss that is caused by the dragging of the first motor generator 10. If the determination in the step S9 is negative, the current travel mode only needs to be maintained. Thus, no control is particularly executed, and the routine returns. On the other hand, if the determination has been made to make the transition to the disconnected EV mode, and thus the determination in the step S9 is positive, the transition (switching) of the travel mode is prohibited (a step S10). In other words, the disconnected EV mode is prohibited, and this is substantially the same as a case where the control in the above step S8 is executed.

Accordingly, when the vehicle speed V is at most equal to the second vehicle speed threshold value V2, the disengagement of the clutch K0 is prohibited, and thus the state in which the engine 1 is connected to the power dividing mechanism 3 is maintained. In this case, even if the engine 1 is stopped and the rotation of the carrier 6 is thereby stopped, the rotational speed of the ring gear 5 is a low rotational speed due to the low vehicle speed, and thus, the rotational speed of the first motor generator 10 and that of the pinion gear P can each be suppressed to the low rotational speed. In addition, even in, a case where the vehicle stops and the switching operation of the clutch K0 cannot be performed due to abnormality of certain kind, the drive power of the engine 1 can be transmitted to the first motor generator 10 for the electric power generation, or the drive power of the engine 1 can be transmitted to the drive wheel 2 via the power dividing mechanism 3. It is because the clutch K0 has already been engaged. Thus, even when such abnormality occurs, running of the hybrid vehicle can be guaranteed. Furthermore, the clutch K0 is engaged while the vehicle stops. Thus, even when the clutch K0 is installed to be exposed to the outside of the vehicle, it is possible to prevent or suppress invasion of a foreign object, water, or the like to a friction surface.

The specific example, which is described above, is configured such that the normal EV mode is uniformly prohibited when the vehicle speed V is at least equal to the first vehicle speed threshold value V1. However, in the present invention, if the vehicle speed V is a high vehicle speed to some extent, it is possible to prohibit or permit the normal EV mode by setting a condition. Such an example is shown in a flowchart in FIG. 3. Like the routine that is shown in FIG. 1 and described above, a routine shown in FIG. 3 is repeatedly executed at every specified short time interval while the vehicle travels or while a main switch is on. In this routine, it is first determined whether the vehicle speed is at least equal to a first vehicle speed threshold value V11 (a step S21). The first vehicle speed threshold value V11 may be same as the first vehicle speed threshold value V1 that is set in the above-mentioned control shown in FIG. 1, or may be a value that is either smaller or larger than the first vehicle speed threshold value V1. In addition, the first vehicle speed threshold value V11 can be set in advance as a lower limit value of the vehicle speed at which the rotational speed of the first motor generator 10 or that of the pinion gear P becomes excessively high when the normal EV mode is set. Thus, the first vehicle speed threshold value V11 is a larger threshold value than the second vehicle speed threshold value V2, which is described above.

If the vehicle speed V is at least equal to the first vehicle speed threshold value V11, and thus the determination in the step S21 is positive, it is determined whether the normal EV mode has been set (a step S22). The control in the step S22 is same as the above-mentioned control in the step S2 of the routine in FIG. 1. If the determination in the step S22 is positive, it is determined whether the vehicle speed V is at least equal to a third vehicle speed threshold value V12 (a step S23). The third vehicle speed threshold value V12 is a threshold value that is set in advance in terms of the design as a lower limit value of the vehicle speed at which the rotational speed of the first motor generator 10 and that of the pinion gear P each become a high rotational speed when the clutch K0 is engaged while the engine 1 is stopped. This high rotational speed should be avoided in terms of durability, the power loss, or the like. Accordingly, if the determination in the step S23 is positive, transition control to the disconnected EV mode or the hybrid (HV) mode is executed (a step S24), and the routine returns. The control of the step S24 is same as the control in the step S3 that is shown in FIG. 1 and described above. Thus, it is possible to avoid or suppress each of the first motor generator 10 and the pinion gear P from rotating at the excessively high rotational speed.

On the other hand, if the determination in the step S23 is negative, the vehicle speed V is at least equal to the first vehicle speed threshold value V11 and is lower than the third vehicle speed threshold value V12. In this case, it is determined whether a time required to disengage the clutch K0 in the engaged state (a disengagement time) is at most equal to a predetermined reference value (a step S25). As an example, the disengagement time is a time required to reduce the transmission torque capacity of the clutch K0 to a predetermined specified value since a disengagement command signal is output. Although the disengagement time of the clutch K0 and a control system thereof is configured to fall within a range that is set in terms of the design, there is a case where the disengagement time is extended due to deterioration (or a change) with age of a friction material, a link mechanism for performing the engagement or disengagement operation, the actuator, or the like. If the disengagement time is extended, a time required to engage the clutch to a state with no slippage during an engagement operation is also extended. In other words, a time during which the slippage occurs as a transition state of the clutch K0 is likely to be extended when the clutch K0 is being engaged or disengaged. The disengagement time can be calculated by detecting a slippage rotational speed (a differential rotational speed) of the clutch K0 after an engagement command or a disengagement command is output.

Thus, if the disengagement time of the clutch K0 is longer than the reference value, and thus the determination in the step S25 is negative, the routine proceeds to the step S24, which is described above, and it is prohibited from setting the normal EV mode. More specifically, during the so-called EV travel in which the engine 1 is stopped and the vehicle travels by the drive power of the second motor generator 12, the engagement of the clutch K0 is prohibited, and thus the disengagement state of the clutch K0 is maintained. Accordingly, in a case where the vehicle speed V falls under a range that is at least equal to the first threshold value on a high-speed side and is lower than the second threshold value on the high-speed side in a state that the vehicle travels in the normal EV mode, even when another condition of switching to the disconnected EV mode is not satisfied, the clutch K0 is disengaged to set the disconnected EV mode, or the engine 1 is started to set the HV mode. At the time when the condition to set the disconnected EV mode, such as that the vehicle speed V is reduced, is satisfied, the clutch K0 has already been disengaged. Thus, after the condition of setting the disconnected EV mode is satisfied, it is possible to shorten a time at which the clutch K0 remains engaged and the first motor generator 10 and the pinion gear P each rotate at the high rotational speed. Therefore, it is possible to prevent or suppress worsening of electricity efficiency or fuel economy.

A further description will be made on a reason why such control is executed. The vehicle speed V becomes at least equal, to the third vehicle speed threshold value, and the disengagement control of the clutch K0 is initiated. At this time, if a time required for disengagement of the clutch K0 is long, the vehicle speed is increased before the clutch K0 is fully disengaged, and consequently, a possibility that the rotational speed of the pinion gear P is excessively increased in conjunction with an increase in the vehicle speed becomes high. In order to avoid such a circumstance, control may be executed in which, even if the vehicle speed V is increased during the time that is required for the disengagement of the clutch K0, the clutch K0 has already been disengaged at a moment that the time elapses. In order to achieve this, as described above, the first vehicle speed threshold value that is smaller than the third vehicle speed threshold value is provided as a threshold value that is used to determine whether the disengagement control of the clutch K0 is executed. In other words, the determination on the disengagement of the clutch K0 is made in an early period when the vehicle speed is low. Accordingly, even when the time required for the disengagement of the clutch K0 is long, the transmission torque capacity of the clutch K0 is sufficiently reduced at a moment that the vehicle speed V reaches the third vehicle speed threshold value, and the rotational speed of the pinion gear P does not become the excessively high rotational speed. Thus, if the vehicle speed V is at least equal to the third vehicle speed threshold value, the disengagement control of the clutch K0 is executed immediately. In addition, if the vehicle speed V does not reach the third vehicle speed threshold value but becomes at least equal to the first vehicle speed threshold value, the disengagement control of the clutch K0 is initiated.

If the disengagement time of the clutch K0 is at most equal to the reference value (if the determination in the step S25 is positive), there is, little concern on the worsening of the electricity efficiency or the fuel economy when the transition to the disconnected EV mode is made. Thus, no control is particularly executed, and the routine returns. That is, the normal EV mode is maintained. In this case, since the engine 1 is connected to the power dividing mechanism 3, a vibration characteristic in this mode differs from that in the disconnected EV mode such that the moment of inertia of the drive power source 21 is increased as a whole. Therefore, it is possible to improve an NV characteristic.

On the other hand, if the normal EV mode has not been set, and thus the determination in the step S22 is negative, it is determined whether a determination has been made to make the transition (switch) to the normal EV mode (a step S26). This is the same control as the control in the step S4 of the routine that is shown in FIG. 1 and described above. If the determination in the step S26 is negative, the current travel mode only needs to be maintained. Thus, no control is particularly executed, and the routine returns. On the other hand, if the determination has been made to make the transition to the normal EV mode, and thus the determination in the step S26 is positive, it is determined whether the vehicle speed V is at least equal to the third vehicle speed threshold value V12 (a step S27). This is the same control as the control in the step S23, which is described above. If the determination in the step S27 is positive, the transition (switching) of the travel mode is prohibited (a step S28). In other words, the normal EV mode is prohibited, and this is substantially the same state as a case where the control in the above step S24 is executed. Thus, it is also possible in this case to reduce the rotational speed of the sun gear 4 and that of the first motor generator 10, which is connected to the sun gear 4, and it is further possible to avoid or suppress the rotational speed of the pinion gear P from becoming excessively high.

On the other hand, if the determination in the step S27 is negative, the vehicle speed V is at least equal to the first vehicle speed threshold value V11 but is lower than the third vehicle speed threshold value V12. In this case, it is determined whether the time required to disengage the clutch K0 in the engaged state (the disengagement time) is at most equal to the predetermined reference value (a step S29). This is the same control as the control in the step S25, which is described above. Thus, if the disengagement time of the clutch K0 is longer than the reference value, and thus the determination in the step S29 is negative, the routine proceeds to, the step S28, which is described above, and the transition to the normal EV mode is prohibited. More, specifically, during the so-called EV travel in which the engine 1 is stopped and the vehicle travels by the drive power of the second motor generator 12, the engagement of the clutch K0 is prohibited, and thus the disengagement state of the clutch K0 is maintained. Accordingly, in the case where the vehicle speed V falls under the above-mentioned range that is at least equal to the first vehicle speed threshold value V11 and is lower than the third vehicle speed threshold value V12 in the state that the vehicle travels in the normal EV mode, even when the condition of switching to the normal EV mode is satisfied, the switching control is prohibited, and the travel mode is maintained in the disconnected EV mode or the HV mode.

In other words, if the disengagement time of the clutch K0 is long enough to exceed the reference value, the disengagement state of the clutch K0 is maintained. Accordingly, the clutch K0 is not switched from the disengaged state to the engaged state or from the engaged state to the disengaged state when the vehicle speed V is high to some extent. In addition, the slipping state as the transition state of the clutch K0 is avoided or suppressed from being continued for a long time. Therefore, it is possible to suppress the worsening of the electricity efficiency or the fuel economy.

If the vehicle speed V is lower than the first vehicle speed threshold value V11, and thus the determination on the step S21 is negative, the same control as the control in the control example that is shown in FIG. 1 and is described above is executed. Thus; the same step numbers are denoted in corresponding steps in FIG. 3, and a description thereof will not be repeated.

Figure 3:
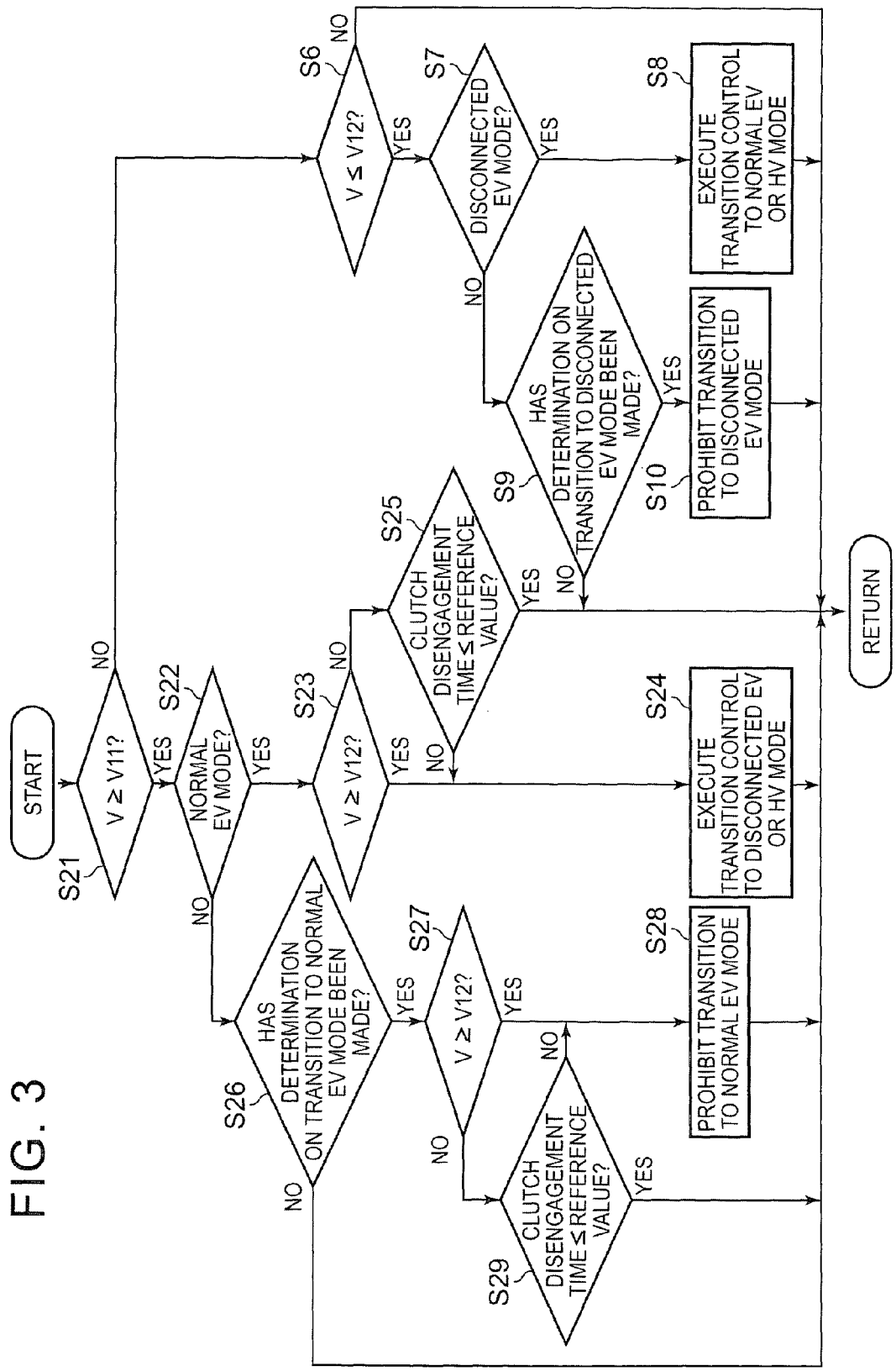
FIG. 3 is a flowchart for illustrating another example of the control that is executed by the control device of the present invention.

Accordingly, when it is configured to execute the control shown in FIG. 3, the further detailed control to execute or prohibit the normal EV mode can be executed. Therefore, it is possible to improve the NV characteristic by setting the vibration characteristic that is suitable for the travel state of the hybrid vehicle, and it is also possible to prevent delayed engagement of the clutch K0 or worsened acceleration response that is caused by the delayed engagement of the clutch K0.

In the above-mentioned specific example, the planetary gear train of the single pinion type is used as the differential mechanism. However, the present invention can also be adopted for a control device for a hybrid vehicle that includes a gear train in which a differential mechanism is configured by a planetary gear train of double pinion type. Also in this case, the same advantages and effects that are described in the above specific example can be obtained.

What is claimed is:

1. A control system for a hybrid vehicle, the hybrid vehicle including an engine, a first motor, a second motor, a differential mechanism, and a clutch, the second motor configured to output drive torque to a drive wheel, the differential mechanism configured to perform a differential action by at least three rotary elements, any one of the rotary elements in the differential mechanism serving as an input element to which drive power is transmitted from the engine, another one of the rotary elements in the differential mechanism being connected to the first motor and serving as a reaction force element, and remaining one of the rotary elements in the differential mechanism serving as an output element for outputting torque to the drive wheel, the clutch configured to connect the engine to the input element not used to connect to the first motor or to the drive wheel, and disconnect the engine from the input element, the control system comprising:
an electronic control unit configured to:
(a) set an EV mode in which a vehicle travels at least by drive power of the second motor among the first motor and the second motor in a state that the engine stops;
(b) prohibit setting of the EV mode in a state that the clutch is fully engaged when a vehicle speed is greater than or equal to a predetermined first vehicle speed threshold value; and
(c) prohibit setting of the EV mode in a state that the clutch is disengaged when the vehicle speed of the vehicle that travels in the EV mode is less than or equal to a predetermined second vehicle speed threshold value, the second vehicle speed threshold value being smaller than the first vehicle speed threshold value.

2. The control system according to claim 1, wherein the differential mechanism is configured by a planetary gear train, the input element not used to connect to the first motor or to the drive wheel is a rotary element represented by a straight line at the center in a collinear diagram of the planetary gear train in which the three rotary elements are represented by straight lines that are parallel to each other, and the reaction force element is a rotary element that is represented by another straight line in the collinear diagram.

3. The control system according to claim 1, wherein the electronic control unit is configured to cancel prohibition to set the EV mode in the state that the clutch is fully engaged when a vehicle speed is greater than or equal to a predetermined first vehicle speed threshold value and permit setting of the EV mode in the state that the clutch is fully engaged when a time required for disengagement of the clutch is greater than or equal to a predetermined reference value and the vehicle speed is greater than or equal to the first vehicle speed threshold value and is lower than a third vehicle speed threshold value, the third vehicle speed threshold value being larger than the first vehicle speed threshold value.

* * * * *